United States Patent
Westover et al.

(10) Patent No.: US 10,118,612 B2
(45) Date of Patent: Nov. 6, 2018

(54) VEHICLES, ELECTRONIC CONTROL UNITS, AND METHODS FOR EFFECTING VEHICLE CHANGES BASED ON PREDICTED ACTIONS OF TARGET VEHICLES

(71) Applicant: Toyota Motor Engineering & Manufacturing North America, Inc., Erlanger, KY (US)

(72) Inventors: Nathan C. Westover, Northville, MI (US); Geoffrey D. Gaither, Brighton, MI (US); Justin J. Chow, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/448,070

(22) Filed: Mar. 2, 2017

(65) Prior Publication Data

US 2018/0251124 A1 Sep. 6, 2018

(51) Int. Cl.
*B60R 22/00* (2006.01)
*E05F 15/00* (2015.01)
(Continued)

(52) U.S. Cl.
CPC ............ *B60W 30/09* (2013.01); *B60W 10/04* (2013.01); *B60W 10/18* (2013.01); *B60W 10/20* (2013.01); *B60W 30/12* (2013.01); *B60W 30/143* (2013.01); *B60W 30/16* (2013.01); *B60W 30/188* (2013.01); *B60W 30/18163* (2013.01); *B60W 2510/18* (2013.01); *B60W 2520/04* (2013.01); *B60W 2520/10* (2013.01); *B60W 2550/30* (2013.01); *B60W 2710/18* (2013.01);
(Continued)

(58) Field of Classification Search
CPC ...... B60W 30/09; B60W 10/04; B60W 10/18; B60W 10/20; B60W 30/12; B60W 30/143; B60W 30/16; B60W 30/18163; B60W 30/188; G08G 1/16
USPC .................................................... 701/48, 300
See application file for complete search history.

(56) References Cited

U.S. PATENT DOCUMENTS 7,379,879 B1 5/2008 Sloo
9,262,914 B2 2/2016 Purushothaman et al.
(Continued)

OTHER PUBLICATIONS

Road Hero, https://www.crunchbase.com/organization/drivemecrazy#/entity, Published/Accessed: Dec. 14, 2016.
(Continued)

*Primary Examiner* — Mahmoud S Ismail
(74) *Attorney, Agent, or Firm* — Dinsmore & Shohl LLP

(57) ABSTRACT

A vehicle includes a sensor system outputting one or more signals and an electronic control unit communicatively coupled to the sensor system. The electronic control unit may be configured to detect a target vehicle external to the vehicle based on the one or more signals output by the sensor system, identify the detected target vehicle, determine rating information for at least one of the target vehicle and a driver of the target vehicle, predict at least one action of the target vehicle based on the rating information, and effect one or more changes to the vehicle based on the predicted at least one action of the target vehicle.

22 Claims, 5 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 30/09* (2012.01)
*B60W 10/18* (2012.01)
*B60W 10/20* (2006.01)
*B60W 10/04* (2006.01)
*B60W 30/12* (2006.01)
*B60W 30/14* (2006.01)
*B60W 30/16* (2012.01)
*B60W 30/18* (2012.01)
*B60W 30/188* (2012.01)
*G05D 1/02* (2006.01)
*G06F 17/10* (2006.01)
*G06G 7/78* (2006.01)

(52) U.S. Cl.
CPC ..... *B60W 2720/10* (2013.01); *B60W 2750/30* (2013.01)

(56) References Cited

U.S. PATENT DOCUMENTS

| | | |
|---|---|---|
| 9,296,299 B2 | 3/2016 | Ricci |
| 2006/0112103 A1 | 5/2006 | Besserman et al. |
| 2009/0132294 A1 | 5/2009 | Haines |
| 2010/0106418 A1* | 4/2010 | Kindo ............... G05D 1/027 701/300 |
| 2011/0320492 A1 | 12/2011 | Inghelbrecht |
| 2017/0101093 A1* | 4/2017 | Barfield, Jr. ........ B60W 30/095 |

OTHER PUBLICATIONS

U.S. Appl. No. 15/052,647, filed Feb. 24, 2016 entitled "Driving Ratings for Leading or Following Vehicle Selection".

* cited by examiner

VEHICLES, ELECTRONIC CONTROL UNITS, AND METHODS FOR EFFECTING VEHICLE CHANGES BASED ON PREDICTED ACTIONS OF TARGET VEHICLES

TECHNICAL FIELD

The present specification relates to vehicles, electronic control units, and methods for effecting vehicle changes based on predicted actions of target vehicles.

BACKGROUND

Some vehicles use sensors to detect information about the surrounding environment. Such sensors may detect objects in the environment including other vehicles and/or drivers. It may be desirable to alter one or more vehicle settings based on the predicted actions of detected target vehicles.

SUMMARY

In one embodiment, a vehicle includes a sensor system outputting one or more signals and an electronic control unit communicatively coupled to the sensor system. The electronic control unit is configured to detect a target vehicle external to the vehicle based on the one or more signals output by the sensor system, identify the detected target vehicle, determine rating information for at least one of the target vehicle and a driver of the target vehicle, predict at least one action of the target vehicle based on the rating information, and effect one or more changes to the vehicle based on the predicted at least one action of the target vehicle.

In another embodiment, an electronic control unit is configured to detect a target vehicle external to a vehicle based on one or more signals output by a sensor system, identify the detected target vehicle, determine rating information for at least one of the target vehicle and a driver of the target vehicle, predict at least one action of the target vehicle based on the rating information, and effect one or more changes to the vehicle based on the predicted at least one action of the target vehicle.

In yet another embodiment, a method of effecting one or more changes to a vehicle includes detecting a target vehicle external to the vehicle based on the one or more signals output by a sensor system, identifying the detected target vehicle, determining rating information for at least one of the target vehicle and a driver of the target vehicle, predicting at least one action of the target vehicle based on the rating information, and effecting one or more changes to the vehicle based on the predicted at least one action of the target vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles, electronic control units, and methods for effecting vehicle changes based on predicted actions of target vehicles. The surrounding environment of the vehicle can be sensed to detect one or more target vehicles therein. The detected target vehicle may be identified and rating information for at least one of the target vehicle and a driver of the target vehicle may be determined. From this rating information, a predicted action of the target vehicle can be made. The vehicle can then effect a change to the vehicle based on the predicted action of the target vehicle. In some methods, this may improve the performance or operation of the vehicle.

Figure 1:
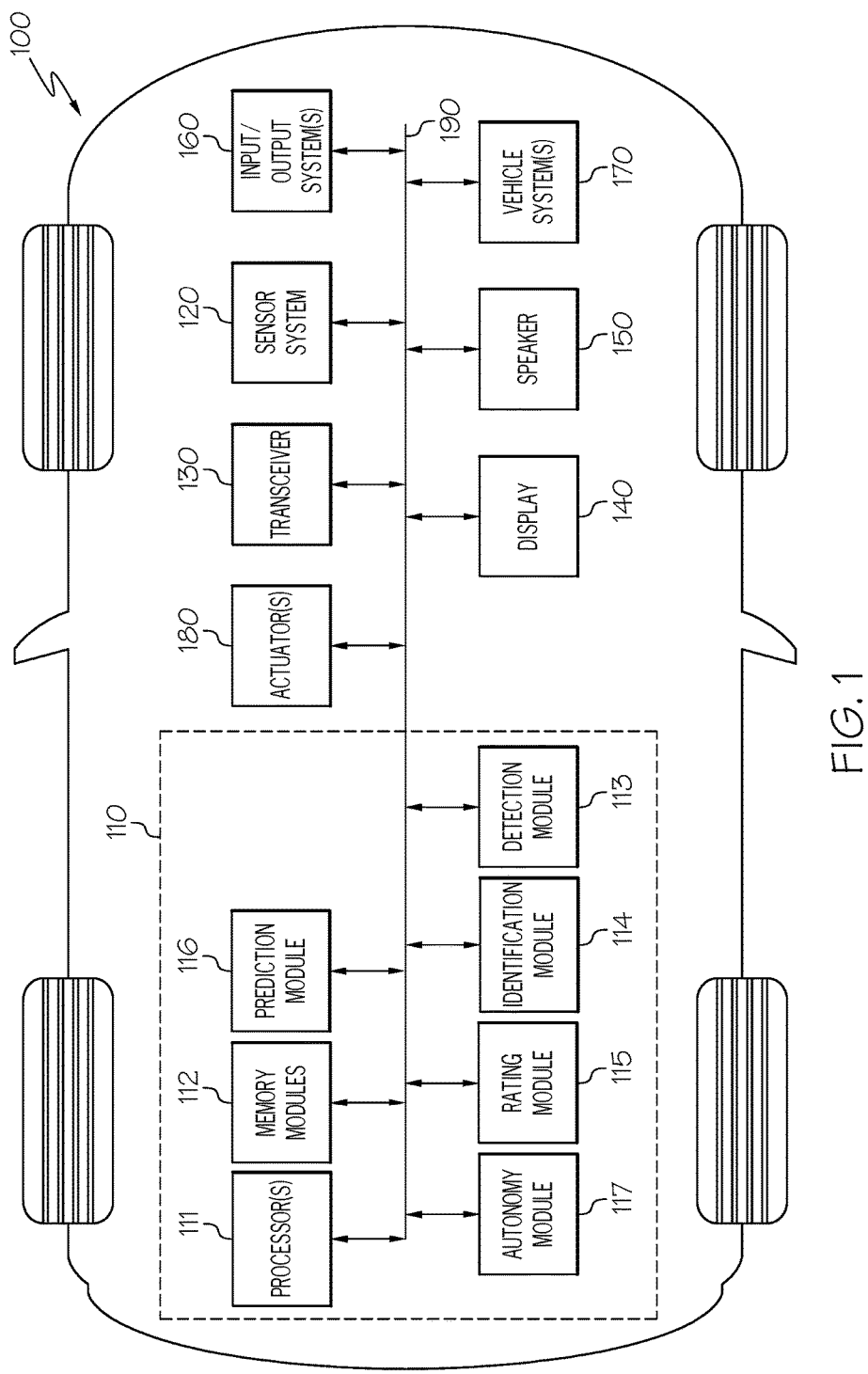
FIG. 1 depicts an example of a vehicle according to one or more embodiments shown and described herein.

Referring now to FIG. 1, a vehicle 100 includes an electronic control unit (ECU) 110, a sensor system 120, a transceiver 130, a display 140, a speaker 150, an input/output system 160, one or more vehicle systems 170, one or more actuators 180, and a communication path 190.

The ECU 110 includes one or more processors 111, one or more memory modules 112, a detection module 113, an identification module 114, a rating module 115, a prediction module 116, and an autonomy module 117. The interaction of the various components of the ECU 110 and other components of the vehicle 100 will be described in detail below.

Each of the one or more processors 111 of the vehicle 100 may be any device capable of executing the logic described herein. Accordingly, each of the one or more processors 111 may be a controller, an integrated circuit, a microchip, a computer, or any other computing device. In some embodiments, each of the one or more processors 111 may be configured to execute machine-readable instructions to carry out the logic described herein. In some embodiments, at least one of the one or more processors 111 is hard coded to perform at least a portion of the logic described herein. In some embodiments the one or more processors 111 are hard coded to perform the logic described herein.

The one or more processors 111 may be communicatively coupled to the other components of the vehicle 100 through the communication path 190. Accordingly, the communication path 190 may communicatively couple any number of processors with one another, and allow the components coupled to the communication path 190 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more memory modules 112 of the vehicle 100 or of the ECU 110 is coupled to the communication path 190 and communicatively coupled to the one or more processors 111. The one or more memory modules 112 may comprise RAM, ROM, flash memories, hard drives, or any device capable of storing machine-readable instructions such that the machine-readable instructions can be accessed and executed by the one or more processors 111. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored on the one or more memory modules 112. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The vehicle 100 may also include a detection module 113 for detecting and/or recognizing one or more vehicles in the surrounding environment. The detection module 113 may include one or more processors 111 and/or one or more memory modules 112. The detection module 113 may be communicatively coupled to the other components, modules, or systems of the vehicle 100 through the communication path 190. The functions of the detection module 113 may be implemented as machine-readable instructions that, when executed by the one or more processors 111, implement one or more of the various processes described herein. Alternatively, the detection module 113 may include machine-readable instructions written in a hardware description language (HDL), such as logic implemented via an FPGA configuration, an ASIC, or their equivalents. Accordingly, the functions of the detection module 113 may be implemented in any conventional computer programming language, as pre-programmed hardware elements, or as a combination of hardware and software components. The detection module 113, or portions thereof, may be in or on the vehicle 100 or remote, for example on a network server or cloud server.

The detection module 113 may include object recognition software, such as vehicle or facial recognition software, for recognizing vehicles, drivers of vehicles, or other objects detected by the one or more visual sensors of the sensor system 120. The detection module 113 may include an object image database that may include one or more images of a plurality of different objects, for example, vehicles. The images may be stored or provided in the one or more memory modules 112 or some other component or module of the vehicle 100 in any format such that the detection module 113 or other component or module can process data associated with a detected object and compare the data associated with the detected object to one or more images of a vehicle or other object to determine the nature of the object detected, for example, if it is a vehicle. The object recognition software may compare visual data or other data captured by the sensor system 120 to one or more images or portions of images in the memory modules 112. The detection module 113 may recognize particular types of vehicles, to include specific classes, makes, or models of vehicles.

The vehicle 100 may also include one or more identification modules 114 configured to identify a detected target vehicle and/or to identify a detected driver. The identification module 114 may include one or more processors 111 and/or one or more memory modules 112. The identification module 114 may be communicatively coupled to the other components, modules, or systems of the vehicle 100 through the communication path 190. The functions of the identification module 114 may be implemented as machine-readable instructions that, when executed by the one or more processors 111, implement one or more of the various processes described herein. Alternatively, the identification module 114 may include machine-readable instructions written in a hardware description language (HDL), such as logic implemented via an FPGA configuration, an ASIC, or their equivalents. Accordingly, the functions of the identification module 114 may be implemented in any conventional computer programming language, as pre-programmed hardware elements, or as a combination of hardware and software components. The identification module 114, or portions thereof, may be in or on the vehicle 100 or remote, for example on a network server or cloud server.

The identification module 114 may identify vehicles or drivers of vehicles based on any identifying information, such as identifying information recognized by the detection module 113. The identifying information may include license plate numbers, VINs, bar codes, QR codes, etc. The identifying information may be broadcast by the identified vehicle on a regular or constant basis. The vehicle 100 may query other nearby vehicles for identifying information or receive identifying information from a remote server or other data store. The identification module 114 may access identifying information on one or more local memory modules 112 that stores identifying information. The identification module 114 may be configured to analyze information about a detected vehicle or a detected driver in the surrounding environment of the vehicle 100. Non-limiting examples of identifying information may include a license plate number, a vehicle identification number (VIN) or any other unique identifier such as a bar code or a QR code. Additionally, vehicles surrounding the vehicle 100 may broadcast identifying information or the vehicle 100 may prompt the vehicles in the surrounding area or some other source requesting identifying information at which point the one or more vehicles in the surrounding area or other source may send such identifying information. When an identifier is recognized, such information can be used by the rating module 115, the one or more processors 111, or some other component of the vehicle 100 to request rating information associated with the identifier. The identification module 114 may recognize specific drivers of vehicles, for example, if a vehicle normally has two different drivers, the identification module 114 may recognize each or both of the drivers.

The vehicle 100 may use identifying information to obtain driver or rating information for the one or more detected vehicles. The vehicle 100 may be configured to provide a vehicle occupant with a rating from a rating module 115 or other component or module of the vehicle 100. As used herein, the term "rating" refers to a score or grade for an identified vehicle or a driver of that vehicle that is based upon or formed from user input relating to the ability, skill, behaviors, actions or propensity of a vehicle or driver for following driving regulations, safe operation of a vehicle, courteousness to other vehicles, vehicle occupants, or pedestrians, or ability to operate on a road, highway, street, or other thoroughfare on which vehicles tend to be operated. Accordingly, rating information is information or data related to that rating. The rating module 115 may include one or more processors 111 and/or one or more memory modules 112. The rating module 115 may be communicatively coupled other components, modules, or systems of the vehicle 100 through the communication path 190.

The functions of the rating module 115 may be implemented as machine-readable instructions that, when executed by the one or more processors 111, implement one or more of the various processes described herein. Alternatively, the rating module 115 may include machine-readable instructions written in a hardware description language (HDL), such as logic implemented via an FPGA configuration, an ASIC, or their equivalents. Accordingly, the functions of the rating module 115 may be implemented in any conventional computer programming language, as pre-programmed hardware elements, or as a combination of hardware and software components. The rating module 115, or portions thereof, may be in or on the vehicle 100 or remote, for example on a network server or cloud server.

The rating information may be analyzed or processed by the rating module 115 or other component or module of the vehicle 100 such that a particular driver or vehicle receives a certain rating score that is an average of all of the driver or vehicle's individual ratings. The vehicle rating score may be, for example, an alpha-numeric representation of a score such as "a 9.4 out of 10" or a particular number of stars or other pictographic representation of a score. The rating information may be filtered such that ratings of vehicles or drivers that have not received a minimum number of ratings is ignored. The rating information may be filtered such that rating information, or for example rating scores, of or from vehicles or drivers that are above or below a certain threshold are ignored.

The rating module 115 may display or otherwise provide the rating or rating information of an identified vehicle or driver to the occupants of the vehicle 100 (e.g., via the display 140 and/or the speaker 150). The rating module 115 may also send rating information to one or more other components, modules or systems of the vehicle 100 through the communication path 190 for use by the other components, modules, or systems. For example, the rating information may be used by the prediction module 116 to implement one or more vehicle maneuvers or to alter one or more vehicle settings based on rating information.

In some embodiments, the vehicle 100 may include one or more prediction modules 116 for generating one or more predictions about the behavior or actions of a nearby vehicle based on the rating information or other information associated with the nearby vehicle. As used herein, a prediction means a calculation of the likelihood that a nearby or identified vehicle will take a particular action or driving maneuver, act in accordance with a particular trait or behavior, and/or cause a particular maneuver or event to happen within the surrounding area of the vehicle 100. The prediction module 116 may include one or more processors 111 and/or one or more memory modules 112. The prediction module 116 may be communicatively coupled to the other components, modules, or systems of the vehicle 100 through the communication path 190. The functions of the prediction module 116 may be implemented as machine-readable instructions that, when executed by the one or more processors 111, implement one or more of the various processes described herein. Alternatively, the prediction module 116 may include machine-readable instructions written in a hardware description language (HDL), such as logic implemented via an FPGA configuration, an ASIC, or their equivalents. Accordingly, the functions of the prediction module 116 may be implemented in any conventional computer programming language, as pre-programmed hardware elements, or as a combination of hardware and software components. The prediction module 116, or portions thereof, may be in or on the vehicle 100 or remote, for example on a network server or cloud server.

The prediction module 116 may process or analyze rating information to predict the behavior or actions of a nearby vehicle in order to output the prediction. The prediction may be transmitted to the one or more processors 111 or to any other module or system of the vehicle 100, for example the autonomy module 117, using the communication path 190, such that the autonomy module 117 may initiate one or more maneuvers or alter one or more vehicle settings based on the one or more signals from the one or more prediction modules 116. In some embodiments, the prediction module 116 may receive an input from the rating module 115 such that the vehicle rating of a nearby vehicle or driver may be used to predict an action or behavior of the nearby vehicle.

The vehicle 100 may include one or more autonomy modules 117 for autonomous or assisted driving of the vehicle 100. As used herein, autonomous driving refers to any automated alterations to the vehicles path, pre-planned route, speed, direction, or any system status that is implemented and executed without user input. The autonomy module 117 may include one or more processors 111 and/or one or more memory modules 112. The autonomy module 117 may be communicatively coupled to the other components, modules, or systems of the vehicle 100 through the communication path 190. The functions of the autonomy module 117 may be implemented as machine-readable instructions that, when executed by the one or more processors 111, implement one or more of the various processes described herein. Alternatively, the autonomy module 117 may include machine-readable instructions written in a hardware description language (HDL), such as logic implemented via an FPGA configuration, an ASIC, or their equivalents. Accordingly, the functions of the autonomy module 117 may be implemented in any conventional computer programming language, as pre-programmed hardware elements, or as a combination of hardware and software components. The autonomy module 117, or portions thereof, may be in or on the vehicle 100 or remote, for example on a network server or cloud server.

The autonomy module 117 may be configured to receive, capture, and/or determine location information for objects within the surrounding environment of the vehicle 100 for use by the one or more processors 111 and/or one or more of the components or modules described herein to determine position, orientation, and/or vector of the vehicle 100. The autonomy module 117 may use signals from a plurality of satellites such as global positioning satellites, or any other data and/or signals that could be used to determine the state of the vehicle 100 or determine the position, orientation, and/or vector of the vehicle 100 in respect to its environment.

The autonomy module 117 may be configured to determine travel path, current driving maneuvers, future driving maneuvers, and/or modifications to current assistive or autonomous driving maneuvers based on data acquired by the sensor system 120 and/or data from any other suitable source. As used herein, driving maneuver refers to one or more actions that affect the movement of the vehicle. Some examples of driving maneuvers include accelerating, decelerating, braking, turning, moving in a lateral direction, changing lanes, merging into a travel lane, reversing, etc. The autonomy module 117 can cause, directly or indirectly, such autonomous driving maneuvers to be implemented.

The autonomy module 117 may control the navigation and/or maneuvering of the vehicle 100 by controlling one or more of the vehicle systems 170 and/or components thereof. For instance, the one or more processors 111 and/or the autonomy module 117 may control the direction and/or the speed of the vehicle 100. As other examples, the one or more processors 111 and/or the autonomy module 117 may cause the vehicle 100 to brake by applying the brakes of the vehicle 100, to changes lanes by turning the front wheels of the vehicle 100, and/or slow down by reducing the amount of fuel supplied to the engine of the vehicle 100.

In some embodiments, the autonomy module 117 may include an active cruise control feature. The active cruise control maintain a following distance between the vehicle 100 and a leading vehicle. As used herein, the term "following distance" refers to the minimum distance the vehicle 100 will follow a leading vehicle. The following distance may be set automatically by the ECU 110 or a component or combination of components of the ECU 110, by an occupant of the vehicle 100 (e.g., the driver), or in some other way. As non-limiting examples, the active cruise control feature of the autonomy module 117 may be configured to maintain a following distance of 100 feet, or three average car lengths, or any other distance. Further, the active cruise control feature may be configured to maintain a particular speed of the vehicle 100 provided that the following distance criteria is met, such that the autonomy module 117 automatically adjusts the speed of the vehicle 100 with respect to maintaining a following distance between the vehicle 100 and a leading vehicle.

The sensor system 120 includes one or more sensors. For example, the sensor system 120 may include one or more, or any combination of, a laser scanner, a capacitive displacement sensor, a Doppler effect sensor, an eddy-current sensor, an ultrasonic sensor, a magnetic sensor, an optical sensor, a radar sensor, a sonar sensor, a LIDAR sensor, or the like. In embodiments of the vehicle 100 having one or more sensors, the sensors may work independently or in combination with one another as one or more networks of sensors. The sensor system 120 may be communicatively coupled to the other components, modules, or systems of the vehicle 100 through the communication path 190.

The vehicle 100 may also include a transceiver 130 for sending and/or receiving any wired or wireless communication. For example, the vehicle 100 may include an antenna, a modem, LAN port, Wi-Fi card, WiMax card, mobile communications hardware, near-field communication hardware, satellite communication hardware and/or any wired or wireless hardware for communicating with other networks and/or devices. In one or more embodiments, the vehicle 100 may include hardware configured to operate in accordance with the Bluetooth wireless communication protocol. In some embodiments, the vehicle 100 may include a Bluetooth send/receive module for sending and receiving Bluetooth communications.

The vehicle 100 may comprise one or more displays 140 for providing visual output such as, for example, information regarding road conditions or rating information. For example, in some embodiments, the one or more displays 140 may be components of the vehicle center console. The one or more displays 140 may be coupled to other modules of the vehicle 100 through the communication path 190. The one or more displays 140 may include any medium capable of transmitting an optical output such as, for example, a cathode ray tube, light emitting diodes, a liquid crystal display, a plasma display, or the like. Moreover, the one or more displays 140 may be touchscreens that, in addition to providing optical information, detect the presence and location of a tactile input upon a surface of or adjacent to the one or more displays 140. Accordingly, each display 140 may receive mechanical input directly upon the optical output provided by the display 140. Additionally, it is noted that the one or more displays 140 may include at least one of the one or more processors 111 and one of the one or memory modules 112. Additionally, some embodiments of the vehicle 100 may not include a display 140.

The vehicle 100 may include one or more speakers 150 for the production of sound within the vehicle 100. The one or more speakers 150 may transform data signals into mechanical vibrations, such as in order to output audible prompts or audible information. The one or more speakers 150 may be coupled to the communication path 190 and be communicatively coupled to the one or more processors 111. The one or more speakers 150 may be in the form of in-wall speakers, headphones such as over-the-ear headphones, in-ear headphones, noise canceling headphones, or any other suitable device or combination of devices for producing sounds.

The vehicle 100 may include one or more input/output systems 160. The input/output systems 160 may include any device, system, component, or arrangement of these that enables data, set points, instructions, or other information to be entered into or output from a system. The input/output system can receive information from or send information to any occupant or other user of the vehicle 100. Any suitable method of inputting or outputting information can be used; as non-limiting examples, a touchscreen, a keypad, a display, speakers, earphones, a microphone, etc.

The vehicle 100 may include one or more vehicle systems 170. Examples of such systems include, but are not limited to, a propulsion system, a steering system, a driving system, a throttle system, a lighting system, a navigation system, and a global positioning system. These vehicle systems 170 may be separately defined, but each or any of the systems or portions thereof may be otherwise combined or separated using hardware and/or software within the vehicle 100. Each or any of the vehicle systems 170 may be communicatively coupled to each or any of the components of the vehicle 100 or the ECU 110 using the communication path 190.

In some embodiments, the vehicle 100 may include one or more actuators 180. The one or more actuators 180 may be a component or combination thereof that modify one or more vehicle systems or components thereof in response to signals or other inputs from one or more components such as the one or more processors 111 or the autonomy module 117. In some embodiments, the actuators 180 are, for example, motors, pneumatic actuators, hydraulic pistons, relays, solenoids, and/or piezoelectric actuators.

The communication path 190 may be formed from any medium that is capable of transmitting a signal such as, for example, conductive wires, conductive traces, optical waveguides, or the like. In some embodiments, the communication path 190 may facilitate the transmission of wireless signals, such as WiFi, Bluetooth, and the like. Moreover, the communication path 190 may be formed from a combination of mediums capable of transmitting signals. In one embodiment, the communication path 190 comprises a combination of conductive traces, conductive wires, connectors, and buses that cooperate to permit the transmission of electrical data signals to components of the vehicle 100. Accordingly, the communication path 190 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Figure 2:
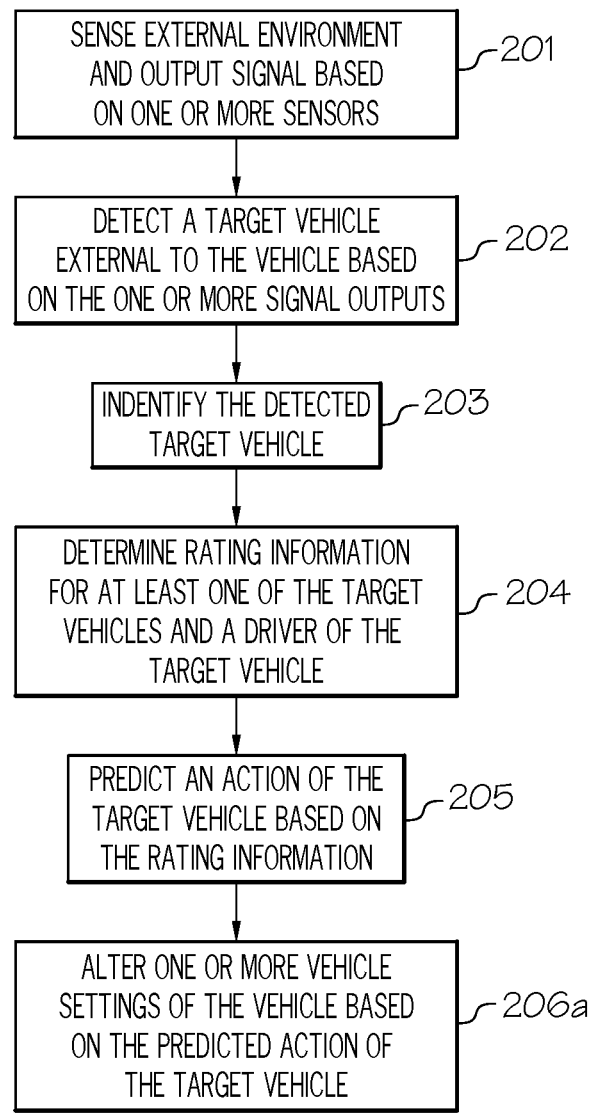
FIG. 2 depicts a method of altering one or more vehicle settings based on a predicted action of the target vehicle according to one or more embodiments shown and described herein.
Figure 3:
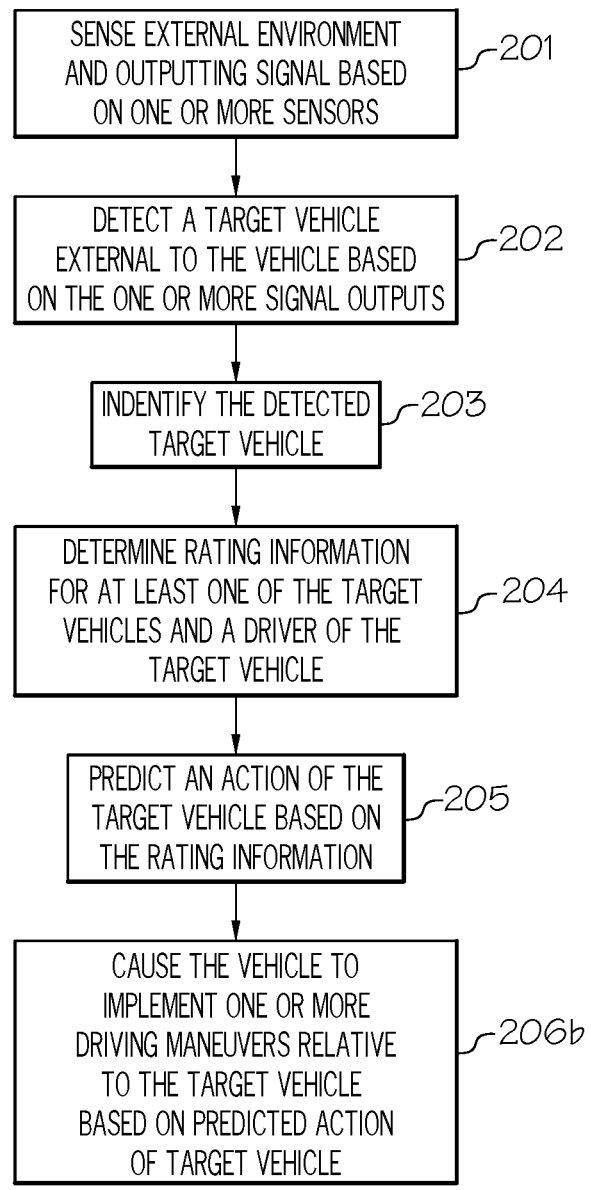
FIG. 3 depicts a method of implementing one or more driving maneuvers based on a predicted action of the target vehicle according to one or more embodiments shown and described herein.

Referring now to FIGS. 2 and 3, embodiments of methods for effecting one or more changes to the vehicle are described. As used herein, the term "target vehicle" refers to a vehicle within a sensing distance such that the target vehicle is sensed by the vehicle 100 or nearby the vehicle 100 such that the vehicle 100 may need to immediately or in the future make a maneuver or alter a vehicle setting based on the actions or behaviors of the target vehicle. That is, if it is possible that the sensed vehicle could have an effect on the actions of the vehicle 100, the vehicle is a target vehicle. The methods shown in FIGS. 2 and 3 are understood to be applicable to embodiments described in this specification, but the method could be carried out using steps that are not shown or described herein and the method is not so limited as to require every step shown in FIGS. 2 and 3. Additionally, the steps shown in FIGS. 2 and 3 do not need to be performed in the particular order shown. Various steps may be performed simultaneously, for example, or in an order different than that shown.

At block 201, the sensor system 120 senses the surrounding environment using one or more sensors to sense one or more objects. Embodiments of the sensor system 120 include laser scanners, capacitive displacement sensors, Doppler effect sensors, eddy-current sensors, ultrasonic sensors, magnetic sensors, optical sensors, radar sensors, sonar sensors, LIDAR sensors, or the like. The sensing may be performed continuously, periodically, randomly, on-demand, or at some other periodicity. Once the sensor system 120 senses an object in the surrounding environment, it sends a signal via the communication path 190 to one or more other modules of the ECU 110, for example, the detection module 113 and/or the identification module 114.

At block 202, the recognition module 113 receives the signal of a sensed object from the sensor system 120 and processes the signal to determine whether the sensed object is a vehicle or not. In the case of a signal from an optical sensor, the recognition module 113 may use object recognition software to determine whether or not the object is a vehicle. As described above, an image of the object may be compared to one or more images stored in the one or more memory modules 112 or remotely to determine whether the object is a vehicle or not.

The image data may be processed using one or more algorithms. Any known or yet-to-be developed optical character recognition algorithms may be applied to the image data in order to recognize text included in the image data. One or more object recognition algorithms may be applied to the image data to extract objects. Any known or yet-to-be-developed object recognition algorithms may be used to extract the objects from the image data. Example object recognition algorithms include, but are not limited to, scale-invariant feature transform ("SIFT"), speeded up robust features ("SURF"), and edge-detection algorithms. These methods may be similar to known or yet-to-be developed facial recognition algorithms applied to image data to detect and determine a person within the environment.

Once an object in the surrounding environment is detected and determined to be a vehicle, the target vehicle must be identified. At block 203, the target vehicle or driver of the target vehicle is identified by the one or more processors 111 or some other component or components of the ECU 110, such as, for example, the identification module 114. In some embodiments, the identification module 114 may analyze an image of the license plate of the target vehicle to determine a license plate number of the target vehicle then compare the license plate number to a database of license plate numbers. Additionally, the identification module 114 may recognize certain identifying information unique to a target vehicle, such as the make, model, year, color, shape, or other information associated with a target vehicle. Similarly, the identification module 114 may identify the driver of a detected vehicle using facial recognition software. The identification of the target vehicle or driver of the target vehicle may be sent as a signal to other various components of the ECU 110 or the vehicle 100 using the communication path 190.

Once the vehicle or driver of the vehicle is identified, the rating information associated with that vehicle or driver can be determined by the rating module 115. At block 204, the rating information of the target vehicle or driver of the target vehicle is determined. In some embodiments, the rating information is determined by receiving rating information from an outside source, by comparing the identification of the target vehicle or driver to the identification of vehicles in the memory module 112 locally or remotely and retrieving the information from the one or more memory modules 112, or by some other means.

Rating information may be generated by one or more users and is generally based upon the habits, behavior, tendencies, or other actions of an identified vehicle or the drivers of an identified vehicle such that the information is associated with that particular vehicle or drivers and the amount of rating information increases over time as more users or sources generate information. Rating information may be aggregated from one or more memory modules 112 as one or more ratings associated with an identified vehicle or driver and such aggregation may be stored on or in or sent to the vehicle 100 or modules or systems of the vehicle 100 for the use of the occupants or the modules or systems of the vehicle 100. In some embodiments, the occupants of the vehicle 100 can add to the data stored as rating information in real time as they observe other vehicles and/or drivers in the surrounding environment. For example, users may be able to upload rating information about a particular target vehicle or driver of a target vehicle to remote servers using a mobile app. In some embodiments, the app may ask the user to report or grade on a target vehicle or driver of a target vehicle based on a number of categories such as speed, braking, accelerating, courteousness, propensity for rule following, or the like. Users may include drivers, passengers, pedestrians, observers, law enforcement officers, or any other person or entity that may observe or otherwise rate the identified driver or identified vehicle.

The rating may include rating information for one or more driver traits such as, for example, the propensity for staying in a lane, exceeding the speed limit, tailgating other vehicles, utilizing blinkers, aggressive driving, sudden braking, or swerving; and these are only a few of the possibilities. Rating information may be generated from one or more sources, such as insurance records, driving records, criminal histories, department of public safety records, vehicle history reports, or the like. Vehicle rating may also include rating information for generally positive driver traits such as, for example, driving at a reasonable speed, awareness, quick reactions, etc.

In some embodiments, the rating information may be sent as a signal to the prediction module 116 using the communication path 190 to predict an action of the target vehicle based on the rating information. The prediction module 116 or some other component of the vehicle 100 predicts the likelihood that a nearby or identified vehicle will take a particular action or driving maneuver, act in accordance with a particular trait or behavior, and/or cause a particular maneuver or event to happen within the surrounding area of the vehicle 100. The predicted action of the target vehicle may include actions such as swerving, aggressive acceleration, rapid braking, failure to signal changing a lane, failure to stop at stop signs or red lights, improper signaling, or behaviors such as aggressive driving, tailgating, cutting other drivers off, or erratic behavior, but is not limited thereto.

In some embodiments, the predicted action is calculated based on the rating information using text analyzing software. For example, when a number of individual rating information entries report that a particular target vehicle has cut another vehicle off, the prediction module might predict the target vehicle will cut another vehicle off. Similarly, if rating information describes a particular target vehicle or driver of a target vehicle as frequently braking erratically, the prediction module might predict that the target vehicle will brake erratically. Any type of action that a vehicle may make is possible. The predicted action may be sent as a signal to one or more components of the ECU 110 using the communication path 190 in order to cause the ECU 110 to cause the vehicle 100 to effect a vehicle change, such as altering one or more vehicle settings or implementing one or more vehicle maneuvers.

At block 206a, the one or more processors 111, the autonomy module 117, or some other component or combination of components of the ECU 110 may alter one or more vehicle settings of the vehicle 100 based on the predicted action of the target vehicle. Such alterations may include: adjusting a following distance, adjusting the sensitivity of a lane keep assist feature, adjusting engine parameters, expanding regenerative braking to capture excess braking energy when stopping, adjusting power train control, or any other possible alteration or combination of alterations. In some embodiments, the autonomy module 117 causes the actuators 180 or to vehicle systems 170 to change vehicle settings in response to predicted behavior. Thus, in response to a predicted behavior of erratic braking in a target vehicle, the vehicle 100 may adjust the regenerative braking capability of the vehicle 100 in anticipation of more frequent braking by the vehicle 100 in response to erratic braking by the target vehicle. Or as another example, the vehicle 100 may increase the following distance between the vehicle 100 and the target vehicle in anticipation of erratic braking or sudden stopping as discussed below in reference to FIG. 4.

FIGS. 2 and 3 show examples for effecting vehicle changes based on predicted actions of target vehicles and other embodiments may effect vehicle changes in other manners.

FIG. 3 shows an embodiment of a method for implementing one or more vehicle maneuvers based on a predicted action of a target vehicle. Blocks 201-205 of FIG. 3 are the same as blocks 201-205 of FIG. 2. At block 206b of FIG. 3, the vehicle 100 implements one or more driving maneuvers relative to the target vehicle based on the predicted actions of the target vehicle. In some embodiments of the method, the one or more processors 111, the autonomy module 117, or some other component or combination of components of the ECU 110 may cause the vehicle 100 to implement one or more driving maneuvers relative to the target vehicle based on a predicted action of the target vehicle. Such maneuvers may include: adjusting a position in a lane, changing lanes, accelerating, decelerating, braking, swerving, adjusting a following distance, turning, stopping, or any other possible maneuver or combination of possible maneuvers. As a non-limiting example, the autonomy module 117 may send a signal to the steering system to change lanes to increase the distance between the vehicle 100 and a target vehicle in response to predicted swerving.

Figure 4:
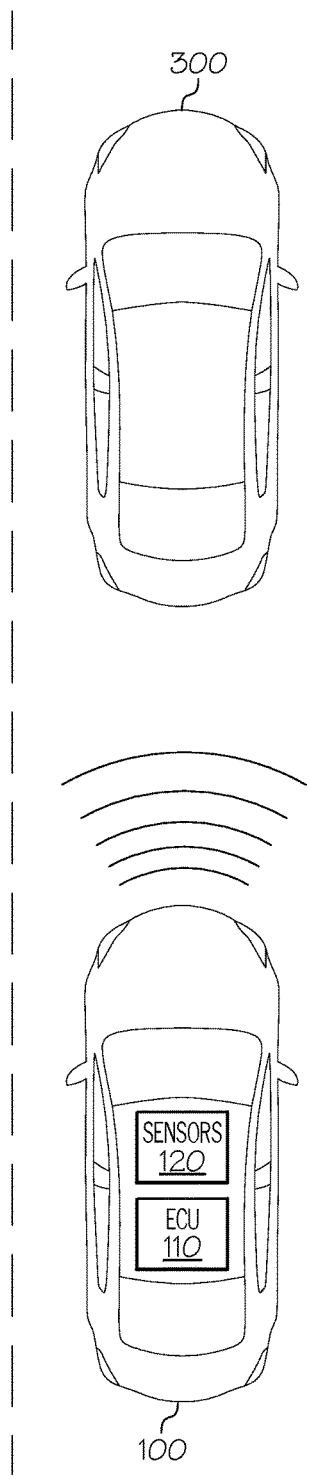
FIG. 4 is an example of a scenario in which the vehicle encounters a target vehicle according to one or more embodiments shown and described herein.
Figure 5:
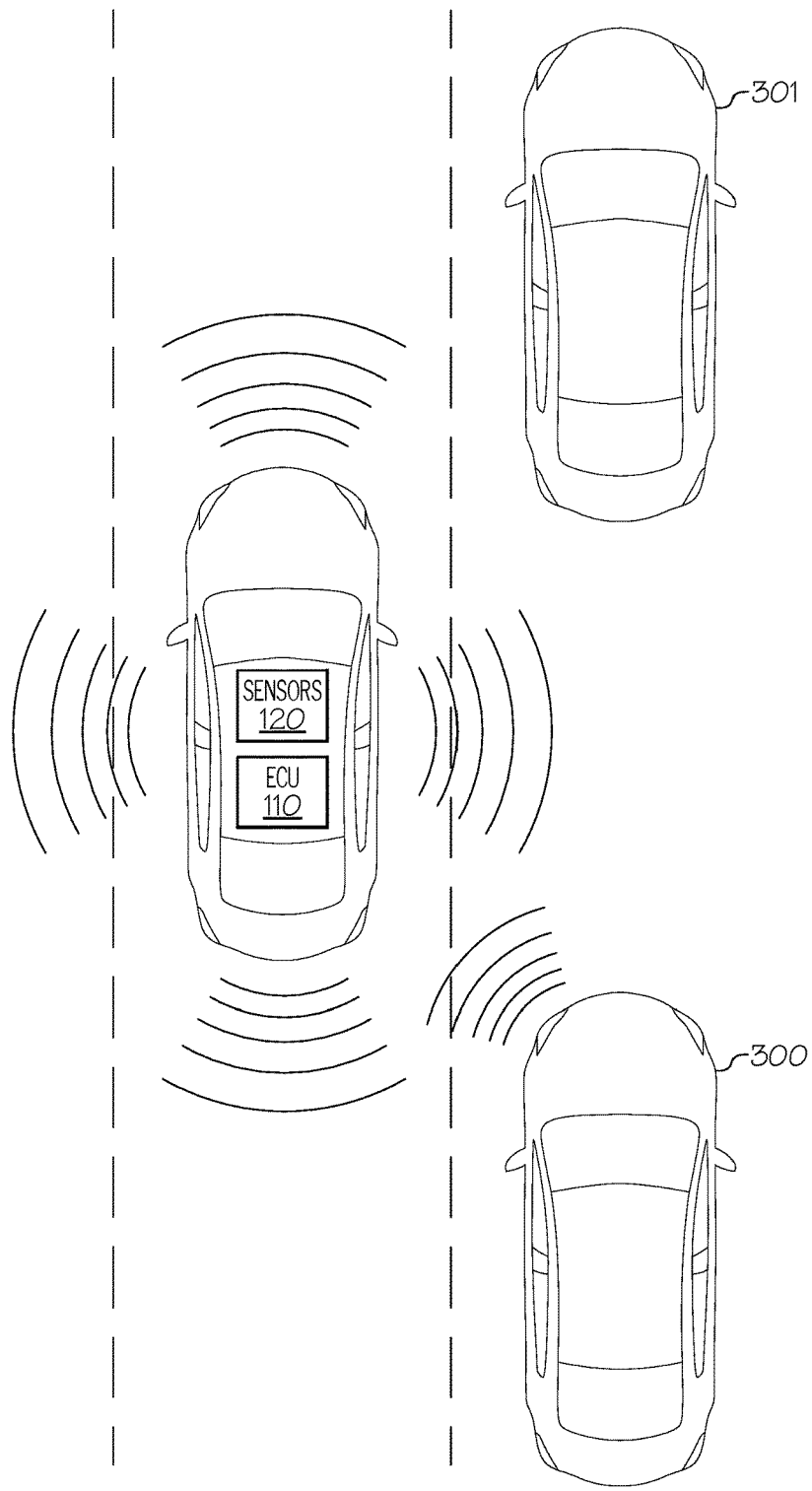
FIG. 5 is an example of a scenario in which the vehicle encounters one or more vehicles, at least one of which is a target vehicle according to one or more embodiments shown and described herein.

FIGS. 4 and 5 demonstrate two possible scenarios implementing the methods and systems described herein. FIG. 4 shows the vehicle 100 sensing the target vehicle 300 ahead of the vehicle 100. FIG. 5 shows the vehicle 100 sensing multiple target vehicles 300, 301. In both scenarios, the target vehicle(s) are sensed using the sensor system 120 of the vehicle 100. FIG. 4 shows the sensor system 120 as sensing in the forward sector of the vehicle 100 with sensing lines but sensing is not limited to the forward sector of the vehicle 100. As shown in FIG. 5, embodiments are directed to sensing 360 degrees of the environment surrounding the vehicle 100. FIG. 5 also depicts an embodiment in which the target vehicle 300 broadcasts its own identifying information allowing the vehicle 100 to immediately identify and determine rating information for the target vehicle 300.

As shown in FIGS. 4 and 5, the vehicle 100 senses one or more objects in the surrounding area using the sensor system 120. Data received by one or more cameras or other sensors of the sensor system 120 causes the sensor system 120 to generate a signal to send to the detection module 113 for detecting the object. The detection module 113 may utilize object recognition software as described above or some other method of detecting the object to determine whether the object is a vehicle or not. Once the vehicle 100 has determined that the external object is a target vehicle, the identification module 114 determines identifying information for the target vehicle, for example, using a camera or other sensor of the sensor system 120. Further, in some embodiments identifying information is immediately recognized by the detection module 113. Examples of immediately identifiable information include bar codes on the target vehicle 300, 301 or the license plate number of the target vehicle 300, 301.

The identifying information is then sent as a signal to the rating module 115 to determine rating information for the target vehicle. The rating information includes information regarding the past behavior or driving habits of the target vehicle or driver of the target vehicle as described above. For example, the rating information may include one or more user inputs. The user inputs may include textual based ratings such as, "[Target vehicle] cut me off on Dec. 21, 2015. I recommend slowing down and staying away if you see [target vehicle] on the street," or number based rating systems, such as four-out-of-five stars for not tailgating or for maintaining a safe following distance. Users might be able to input rating information on demand or be prompted to put in rating information for other vehicles in the surrounding area, for example, the rating module 115 might prompt a user to input rating information for all newly identified vehicles in the surrounding area or for vehicles that have been constantly identified by the identification module 114 of the vehicle for more than a certain number of minutes (e.g., via input to the display 140 and/or the input/output system(s) 160). For example, if the vehicle 100 has held the target vehicle 300 on its sensors for more than a certain amount of time, e.g. 20 minutes, the driver or occupants of the vehicle 100 may have had sufficient time to observe the tendencies of the driver of the target vehicle 300, 301 to generate accurate rating information.

Still referring to FIGS. 4 and 5, the rating information is then sent to the prediction module 116 to determine a prediction of the target vehicle's expected behavior. The prediction module 116 of the ECU 110 generates a prediction of the behavior of the target vehicle based on, for example an average rating of the target vehicle. For example, the prediction module 116 may calculate the likelihood that the target vehicle will erratically brake is 80% and that the target vehicle will swerve is 60% based on a given number of ratings from other users or average rating generated by a number of users. This prediction may be used to generate a signal to the autonomy module 117 to cause the one or more vehicle systems 170 or the actuators 180 to activate the regenerative braking or to change lanes. Conversely, if the prediction module 116 generates a likelihood that the target vehicle will take certain actions, such as swerving or the like, below a certain threshold, for example 10%, the prediction module 116 may send a signal to the autonomy module 117 to take no actions with respect to the target vehicle. The autonomy module 117 may send signals to the one or more vehicle systems 170 or the actuators 180 using the communication path 190 to control the one or more vehicle systems 170 or actuators 180. Additionally, as shown by FIG. 5, the vehicle 100 may effect changes to the vehicle 100 with respect to one or more target vehicles. Thus, the vehicle may perform sense, detect, rate, and effect changes to the vehicle 100 based on more than target vehicle at a time.

FIGS. 4 and 5 illustrate how the vehicle 100 may react differently when it senses one target vehicle or multiple target vehicles in the same area. For example, FIG. 4 shows the vehicle 100 detecting one target vehicle 300. In one potential scenario, the ECU 110 of the vehicle 100 may predict an action of the target vehicle 300, such as swerving, and change lanes to pass the target vehicle 300 or slow down to avoid the target vehicle 300. Given that there are no other target vehicles in the scenario depicted by FIG. 4, the vehicle 100 will not detect other target vehicles, and thus other target vehicles will not effect changes to the maneuvers or settings of the vehicle 100. However, in other scenarios, such as the one illustrated in FIG. 5, additional target vehicles may effect the function of the vehicle 100 or the ECU 110.

FIG. 5 illustrates one of many possibilities in which more than one target vehicles 300, 301 are detected in the area surrounding the vehicle 100. The vehicle 100 may identify the target vehicle 300 and determine that no effect to the vehicle 100 settings or maneuvers are necessary based on a predicted action of the target vehicle 300. However, the vehicle 100 may identify target vehicle 301 and determine that an effect to a vehicle setting is necessary. For example, the vehicle 100 may determine it must maneuver to avoid target vehicle 301. In this scenario, the vehicle 100 will account for the presence of the target vehicle 300 and not change lanes to the right or take some other action that could negatively affect the status of the vehicles and passengers in the area. FIG. 5 also illustrates one scenario in which the target vehicle 300 is broadcasting its own identifying information such that the vehicle 100 can receive such information to identify the target vehicle 300.

Embodiments described herein generally describe vehicles, electronic control units, and methods for effecting vehicle changes based on predicted actions of target vehicles. An ECU may be configured to detect a target vehicle external to the vehicle based on one or more signals output by a sensor system and identify the detected target vehicle. Additionally, the ECU may determine rating information for at least one of the target vehicle and a driver of the target vehicle and predict an action of the target vehicle based on the rating information to effect one or more changes to the vehicle such as altering one or more vehicle settings or implementing one or more vehicle maneuvers on the predicted action of the target vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a sensor system outputting one or more signals; and
   an electronic control unit communicatively coupled to the sensor system and configured to:
   detect a target vehicle external to the vehicle based on the one or more signals output by the sensor system;
   identify the detected target vehicle;
   determine rating information for at least one of the target vehicle and a driver of the target vehicle;
   predict at least one action of the target vehicle based on the rating information; and
   affect one or more changes to the vehicle based on the predicted at least one action of the target vehicle,
   wherein the rating information is based on one or more user inputs.

2. The vehicle of claim 1 wherein effecting the one or more changes to the vehicle comprises one or more of altering one or more vehicle settings and implementing one or more driving maneuvers.

3. The vehicle of claim 2 wherein the one or more driving maneuvers comprise one or more of adjusting the vehicle position in a lane, changing lanes, passing the target vehicle, adjusting a distance between the vehicle and the target vehicle, braking, accelerating, decelerating, swerving, and stopping.

4. The vehicle of claim 3 wherein the vehicle is configured to execute the one or more driving maneuvers from one or more lists with respect to the rating information of the target vehicle or the driver of the target vehicle.

5. The vehicle of claim 2 wherein altering one or more vehicle settings of the vehicle comprises one or more of altering a preprogrammed vehicle route, planning a route to pass the target vehicle, adjusting engine parameters, adjusting one or more regenerative braking parameters, adjusting one or more powertrain control parameters, adjusting one or more accelerator pedal settings, and adjusting the responsiveness of the vehicle acceleration.

6. The vehicle of claim 5 wherein the vehicle is configured to enable at least one of a manufacturer, an end user, or an intermediate user to define one or more lists of settings to be altered with respect to the rating information of the target vehicle or the driver of the target vehicle and to alter such settings with respect to the rating information of the target vehicle or the driver of the target vehicle.

7. The vehicle of claim 1 wherein the rating information is determined from both an identity of the target vehicle and an identity of the driver of the target vehicle.

8. An electronic control unit configured to:
  detect a target vehicle external to a vehicle based on one or more signals output by a sensor system;
  identify the detected target vehicle;
  determine rating information for at least one of the target vehicle and a driver of the target vehicle;
  predict at least one action of the target vehicle based on the rating information; and
  effect one or more changes to the vehicle based on the predicted at least one action of the target vehicle,
  wherein the rating information is based on one or more user inputs.

9. The electronic control unit of claim 8 wherein effecting the one or more changes to the vehicle comprises one or more of altering one or more vehicle settings and implementing one or more driving maneuvers.

10. The electronic control unit of claim 9 wherein the one or more driving maneuvers comprise one or more of adjusting the vehicle position in a lane, changing lanes, passing the target vehicle, adjusting a distance between the vehicle and the target vehicle, braking, accelerating, decelerating, swerving, and stopping.

11. The electronic control unit of claim 10 wherein the electronic control unit is configured to execute the one or more driving maneuvers from one or more lists with respect to the rating information of the target vehicle or the driver of the target vehicle.

12. The electronic control unit of claim 9 wherein altering one or more vehicle settings of the vehicle comprises one or more of altering a preprogrammed vehicle route, planning a route to pass the target vehicle, adjusting engine parameters, adjusting one or more regenerative braking parameters, adjusting one or more powertrain control parameters, adjusting one or more accelerator pedal settings, and adjusting the responsiveness of the vehicle acceleration.

13. The electronic control unit of claim 8 wherein the electronic control unit effects a first change to the vehicle if the rating information meets a particular criteria and the electronic control unit effects a second change if the rating does not meet a particular criteria.

14. The electronic control unit of claim 8 wherein the rating information is determined from both an identity of the target vehicle and an identity of the driver of the target vehicle.

15. A method of effecting one or more changes to a vehicle comprising:
  detecting a target vehicle external to the vehicle based on the one or more signals output by a sensor system;
  identifying the detected target vehicle;
  determining rating information for at least one of the target vehicle and a driver of the target vehicle;
  predicting at least one action of the target vehicle based on the rating information; and
  effecting one or more changes to the vehicle based on the predicted at least one action of the target vehicle,
  wherein the rating information is based on one or more user inputs.

16. The method of claim 15 wherein effecting the one or more changes to the vehicle comprises one or more of altering one or more vehicle settings and implementing one or more driving maneuvers.

17. The method of claim 16 wherein the one or more driving maneuvers comprise one or more of adjusting the vehicle position in a lane, changing lanes, passing the target vehicle, adjusting a distance between the vehicle and the target vehicle, braking, accelerating, decelerating, swerving, and stopping.

18. The method of claim 16 wherein altering one or more vehicle settings of the vehicle comprises one or more of altering a preprogrammed vehicle route, planning a route to pass the target vehicle, adjusting engine parameters, adjusting one or more regenerative braking, adjusting one or more powertrain control parameters, adjusting one or more accelerator pedal settings, and adjusting the responsiveness of the vehicle acceleration.

19. The method of claim 16 wherein the electronic control unit effects a first change or no change to the vehicle if the rating information meets a particular criteria and the electronic control unit effects a second change if the rating does not meet a particular criteria.

20. The method of claim 15 wherein the rating information is determined from both an identity of the target vehicle and an identity of the driver of the target vehicle.

21. The vehicle of claim 1, wherein the rating information is based on one or more user inputs that include one or more of a textual based rating and a number based rating.

22. The vehicle of claim 21, wherein one or more users of the vehicle input the user input on demand or the vehicle prompts the one or more users of the vehicle to input the user input.

* * * * *